Patented June 3, 1930

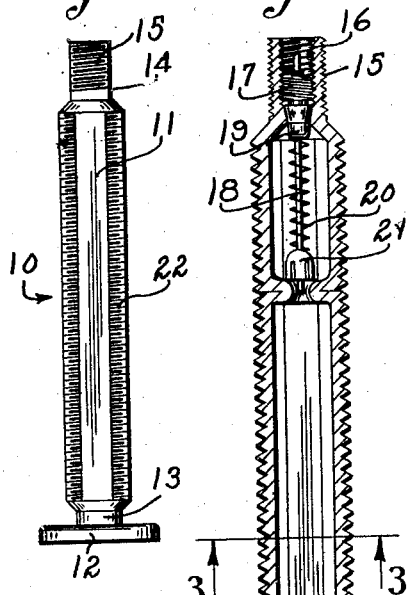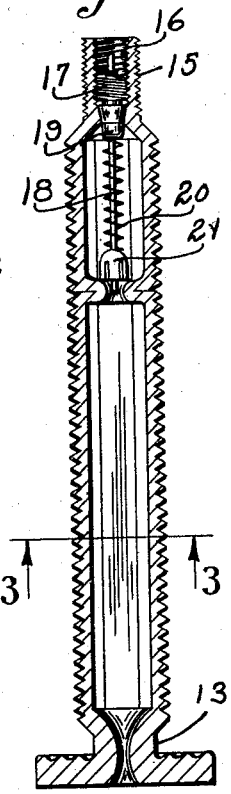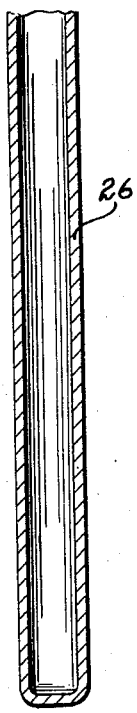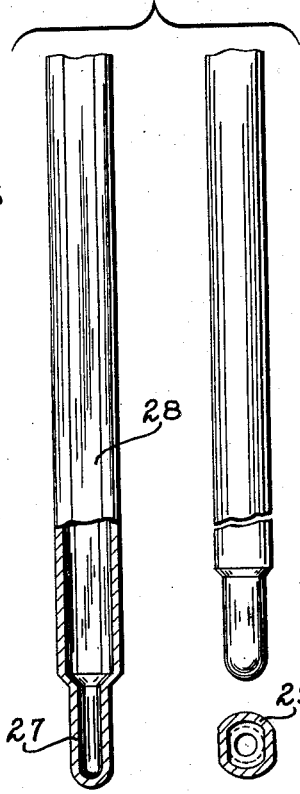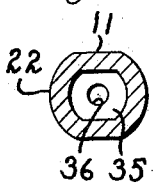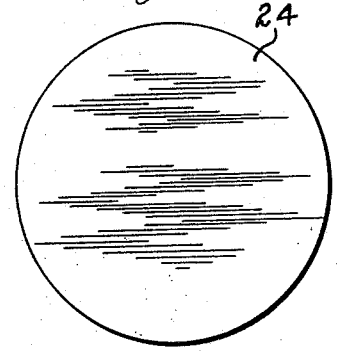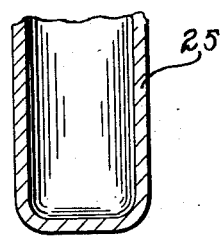

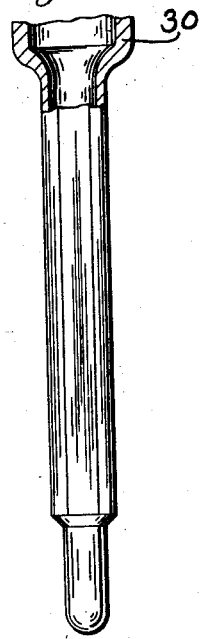
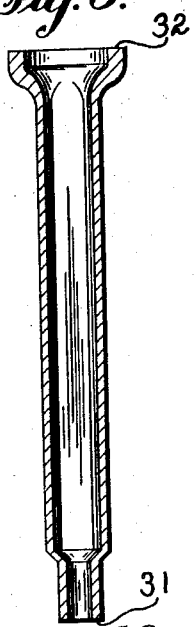
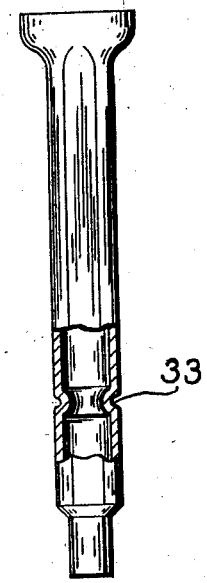
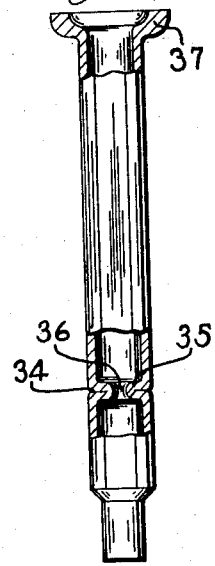
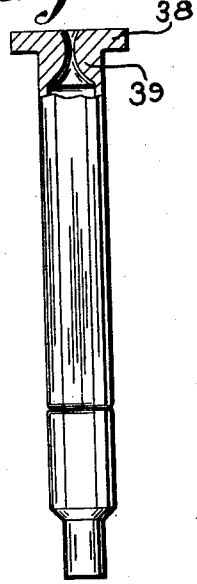
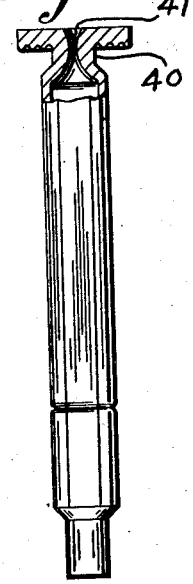

1,761,487

UNITED STATES PATENT OFFICE

ERASTUS G. OAKLEY, OF SOUTHPORT, CONNECTICUT, ASSIGNOR TO BRIDGEPORT BRASS COMPANY, OF BRIDGEPORT, CONNECTICUT

TIRE-VALVE STEM

Application filed August 27, 1924. Serial No. 734,476.

This invention relates to tire valve stems, and more particularly to a valve stem or casing designed for use with pneumatic tires, the invention being particularly concerned with a tube or casing in which the valve proper is mounted. In the past such stems have usually been manufactured from a piece of solid bar stock, the method requiring the drilling or boring of an opening through the entire length of the blank from which the stem is made to provide for the admission of air to the tire after the stem has been connected therewith. For many reasons the product resulting from such a process has not been entirely satisfactory, one of the defects being that the resulting tubular stem is very heavy and is provided with relatively thick walls so that a considerable waste of metal occurs, the walls being much thicker than is necessary to give the stem the required strength. For this and other reasons the stem produced by such a process is expensive and cumbersome.

In making my improved valve stem, I propose to make use of hollow shells or tubes which I may form from a sheet metal blank by a series of drawing operations. These shells may be drawn so that the thickness of the tube wall is properly gauged and exactly the right amount of metal may be left therein to give the wall the required strength.

In a shell formed by such a process there is no means to retain the valve support or valve shoe in position, and as the bore or opening through the shell is relatively large, it cannot be seated upon the inner surface of this wall. I, however, form a valve seating shoulder within the bore of the stem by displacing the thin side wall inwardly to such an extent that only a small opening is left through the stem at this point and the valve shoe being too large to pass through this opening will rest upon the shoulder thus formed. This shoulder may be very expeditiously formed, especially when the metal of the wall of the drawn stem is relatively thin so that it may readily be folded inwardly to form an exterior groove and the walls of this groove closed together to form a substantially flat annular shoulder within the hollow shell and a substantially smooth, exterior surface which may be threaded as is the custom with valve stems now in use.

One object of my invention is to obviate the disadvantages and imperfections present in prior articles of this character by the provision of a valve stem which may be economically made and at the same time will be superior to devices of this kind now in use.

Another object of my invention is to provide a valve stem which shall be of light weight and at the same time possess the strength and durability required of such devices.

A still further object of my invention is to provide a valve stem made from a drawn metal shell which shall have relatively thin side walls so as to be light in weight and economical to manufacture and which will, at the same time, be provided with the customary valve seating shoulder, and other features common to articles of this character in use at the present time.

To these and other ends the invention consists in the novel features and combinations of parts to be hereinafter described and claimed.

In the accompanying drawings:

Fig. 1 is a side view of a tire valve stem embodying my invention;

Fig. 2 is an enlarged sectional view of the same showing a standard form of valve mounted therein;

Fig. 3 is a cross-sectional view on line 3—3 of Fig. 2;

Fig. 4 is a plan view of the blank from which the casing is made, in the form of a sheet metal disk;

Fig. 5 is a sectional view of the blank after it has been cupped;

Fig. 6 is a view similar to Fig. 5 showing the shell after it has been drawn to the proper dimensions showing the relatively thin wall with which the shell is provided;

Fig. 7 comprises two side elevational views taken at right angles to each other, and a plan view of the blank after further drawing operations have been performed in which the closed end has been reduced in size to form the upper neck of the stem and opposite flat sides have been formed upon the blank;

Fig. 8 is a side elevational view of the blank after the wall has been flared adjacent the open end;

Fig. 9 is a sectional view of the blank after the ends have been trimmed;

Fig. 10 is a side elevational view of the blank partly in section showing the inward displacement of the tube wall preparatory to providing the valve supporting shoulder;

Fig. 11 is a view similar to Fig. 10 after the walls of the annular groove have been closed together and the head has been partially formed upon the flared end of the blank;

Fig. 12 shows the blank at the completion of the head-forming operation; and

Fig. 13 is a similar view after the lower external neck has been cut in the stem adjacent the head.

The valve stem which I have selected to illustrate in the accompanying drawings comprises a tubular body portion 10 provided with opposite flat sides 11 and joining a relatively broad disk-like base 12 by a reduced portion or neck 13 formed by an annular exterior groove in the body portion adjacent the base. At the upper end the body 10 is reduced in size to provide the upper neck 14 which is threaded, as shown at 15, to receive the usual valve cap (not shown). As shown in section in Fig. 2, the upper neck is also threaded internally at 16 to receive the threaded plug 17 of the valve-inside. This valve-inside is provided with a stem 18 carrying the valve 19, and embraced by a spring 20 which reacts against a valve support or shoe 21 loosely mounted upon the stem. The body of the valve stem will usually be threaded externally, as shown at 22.

In the manufacture of the valve stem, the blank used may be in the form of a sheet metal disk of proper gauge, shown at 24 in Fig. 4, which is cupped, as shown at 25, and by a series of drawing operations elongated and reduced in diameter to form the long sheet metal shell 26, shown in Fig. 6. It will be noted that the wall of the shell is of relatively thin metal, and that the bore is relatively large.

By further drawing operations, the closed end of this shell may be reduced to form the upper round neck, as shown at 27 in Fig. 7, and the remainder of the body portion of the shell may be similarly provided with opposite flat sides 28. According to the small plan view of Fig. 7, the bore of the valve stem loses its circular shape when these flat sides are drawn upon the stem and assumes the oblong shape, shown at 29, similar to the exterior cross-sectional shape of the shell, the walls of the shell being flattended both exteriorly and interiorly.

As shown at 30, in Fig. 8, the wall of the stem adjacent the open end thereof may be flared outwardly preparatory to forming the disk-like base or head, and the two ends of the stem may be then trimmed at 31 and 32 to provide an opening interiorly through the shell, and to leave at the upper flared end the proper amount of metal required to form the head.

To provide the usual internal shoulder upon which the valve shoe or stock 21 is adapted to seat, I displace the wall of the shell inwardly, as shown at 33 in Fig. 10, so that an annular external groove is formed in the shell wall and a corresponding internal annular shoulder. The extent of the displacement depends somewhat upon the thickness of the wall of the shell, and in the form shown where the wall is relatively thin a considerable amount of metal is displaced so that when pressure is applied at opposite ends of the shell blank, and the annular groove 33 is closed, as shown at 34 in Fig. 11, the shoulder 35 will extend into the bore of the stem for a distance greater than the thickness of the shell wall. The result is that, notwithstanding the thinness of the wall of the shell and the consequent large bore thereof, the shoulder 35 extends toward the center of the bore to such an extent that the remaining opening 36 is sufficiently small so that the valve shoe may not pass therethrough, but will be supported upon the shoulder in position to withstand the pressure of the spring 20. According to the preferred form of my invention, the shoulder 35 will be of slightly greater breadth opposite the rounded portions of the shell wall than opposite the flat sides thereof, so that the opening 36 will be substantially circular in shape, and will be formed at the center of the valve stem notwithstanding the oblong or out-of-round shape of the shell itself. It will be observed that the thickness of the shoulder is substantially double that of the wall of the shell due to the fact that the wall is folded upon itself to form the shoulder, and the metal of the wall being thin makes it possible to fold it evenly and smoothly, notwithstanding the fact that it projects into the bore of the stem to a relatively great extent as compared with the thickness of the wall.

At the same time that the groove 33 is closed the metal at the upper flared end 37 of the shell is caused to flow inwardly and downwardly preparatory to forming the disk-like base at the foot of the completed stem. The formation of this head is completed as shown at 38 in Fig. 12, and the metal is caused to flow inwardly to partially fill the bore of the stem at a point adjacent the head, as shown at 39, in order to provide a relatively thick wall at this point. It will be seen that the wall at the point 39 is considerably more than double the thickness of the wall throughout the body of the shell.

The exterior annular groove 40 is then cut in the thickened portion 39 of the shell adjacent the head, there being sufficient metal in the wall at this point to permit of such an operation and still leave a wall of substantially the same thickness as that of the body of the shell.

The stem may now be completed by providing the threads 22 upon the body thereof and the exterior and interior threads upon the upper neck 14. If the opening 41 has been closed or restricted to too great an extent during the heading operation, this opening may be reamed out to perfect the hole through the stem.

I do not claim in this application a drawn metal valve stem having a single-ply disk-like base in one end thereof or other features which form the subject mater of my prior application, Serial No. 649,669, filed July 5, 1923.

While I have shown and described a preferred embodiment of my invention, it will be understood that it is not to be limited to all the details shown but is capable of modification and variation within the spirit of the invention and within the scope of the appended claim.

What I claim is:

A valve stem comprising a relatively thin drawn metal shell of substantially uniform external diameter between the end portions thereof, said shell being provided with a relatively large bore of substantially uniform diameter between its end portions, the wall of the shell intermediate the ends thereof being displaced inwardly and folded to form an internal shoulder projecting into the bore and having a circular opening therein and a flat upper face at right angles to the axis of the shell, the shell wall at the upper end thereof being displaced inwardly to form an upper round reduced thin walled neck and providing a chamber of relatively large diameter between the neck and shoulder, said neck being threaded internally to receive a valve insides, the flat upper surface of the shoulder being adapted to receive the valve shoe of the valve insides thereon, the wall of the shell at the opposite end from said neck being displaced inwardly to provide a relatively small opening therein and being of greater thickness than the body of the shell, and the wall of the shell below said last-named inwardly displaced portion being displaced outwardly to form a flat disk-like base on the end of the shell, the base being of relatively greater diameter and thickness than the walls of the shell.

In witness whereof, I have hereunto set my hand on this 25th day of August, 1924.

ERASTUS G. OAKLEY.